(12) United States Patent
Kakita et al.

(10) Patent No.: US 9,669,781 B2
(45) Date of Patent: Jun. 6, 2017

(54) STEERING APPARATUS

(71) Applicant: NSK Ltd., Shinagawa-ku, Tokyo (JP)

(72) Inventors: Hiroshi Kakita, Gunma (JP); Daiki Orihara, Gunma (JP); Osamu Kurihara, Gunma (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 15/033,631

(22) PCT Filed: Jun. 19, 2015

(86) PCT No.: PCT/JP2015/067720
§ 371 (c)(1),
(2) Date: Apr. 30, 2016

(87) PCT Pub. No.: WO2016/042873
PCT Pub. Date: Mar. 24, 2016

(65) Prior Publication Data
US 2016/0280159 A1    Sep. 29, 2016

(30) Foreign Application Priority Data

Sep. 16, 2014  (JP) .................................. 2014-187995
Jan. 14, 2015  (JP) .................................. 2015-005053
May 8, 2015   (JP) .................................. 2015-095793

(51) Int. Cl.
*B62D 1/185*    (2006.01)
*B60R 16/03*    (2006.01)
(Continued)

(52) U.S. Cl.
CPC ............ *B60R 16/03* (2013.01); *B60R 16/027* (2013.01); *B62D 1/185* (2013.01); *B62D 1/187* (2013.01); *B62D 1/189* (2013.01); *B62D 1/19* (2013.01)

(58) Field of Classification Search
CPC ........... B62D 1/185; B62D 1/187; B62D 1/19
(Continued)

(56) References Cited

U.S. PATENT DOCUMENTS 7,407,190 B2 *  8/2008  Berg ..................... B60K 26/02
                                                    280/775
2010/0237598 A1 *  9/2010  Johnson ................ B62D 1/192
                                                    280/777
(Continued)

FOREIGN PATENT DOCUMENTS

JP    05-086753 U     11/1993
JP    2003-032869 A    1/2003
(Continued)

OTHER PUBLICATIONS

Translation for JP2009006962A.*
(Continued)

*Primary Examiner* — Faye M Fleming
(74) *Attorney, Agent, or Firm* — Shapiro, Gabor and Rosenberger, PLLC

(57) ABSTRACT

A steering apparatus (2) is disclosed, which includes: a steering shaft (3) having a conductive property and transferring a steering force; an outer column (10) having a conductive property and supporting the steering shaft (3) rotatably; an inner column (11) having a conductive property, being fitted in the outer column (10) to enable a relative movement in an axial direction supporting the steering shaft (3) rotatably together with the outer column (10); a bracket (12) having a conductive property, retaining the outer column (10) and being fixed to a vehicle body; and an electrifying lead (17) having a conductive property and configuring a part of an electrifying path leading to the vehicle body from the inner column (11).

15 Claims, 13 Drawing Sheets

(51) Int. Cl.
*B62D 1/187* (2006.01)
*B62D 1/19* (2006.01)
*B62D 1/189* (2006.01)
*B60R 16/027* (2006.01)

(58) Field of Classification Search
USPC .......................................................... 74/493
See application file for complete search history.

(56) References Cited

U.S. PATENT DOCUMENTS

| | | | |
|---|---|---|---|
| 2011/0163524 A1* | 7/2011 | Aota | B60R 16/027 |
| | | | 280/779 |
| 2012/0319388 A1* | 12/2012 | Ishii | B62D 1/195 |
| | | | 280/777 |
| 2016/0167696 A1* | 6/2016 | Tanaka | B62D 1/195 |
| | | | 74/492 |

FOREIGN PATENT DOCUMENTS

| | | | | |
|---|---|---|---|---|
| JP | 2007203880 A | * | 8/2007 | ............. B62D 1/16 |
| JP | 2008-207612 A | | 9/2008 | |
| JP | 2009-006962 A | | 1/2009 | |
| JP | 2011-088630 A | | 5/2011 | |
| JP | 2014-144667 A | | 8/2014 | |
| WO | WO 04/000627 | | 12/2003 | |

OTHER PUBLICATIONS

Written Opinion of the International Search Authority (WO/ISA), dated Sep. 29, 2015, for International Application No. PCT/JP2015/067720.

Office Action, issued Jul. 5, 2016, in Japanese Application No. 2016-518218.

* cited by examiner

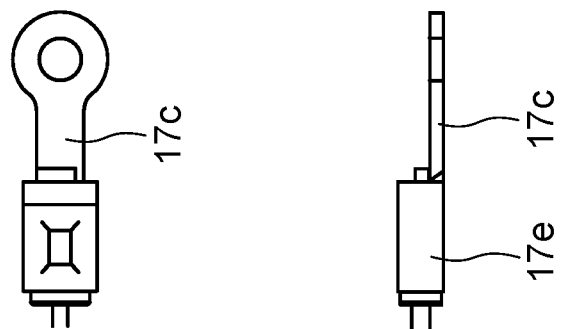
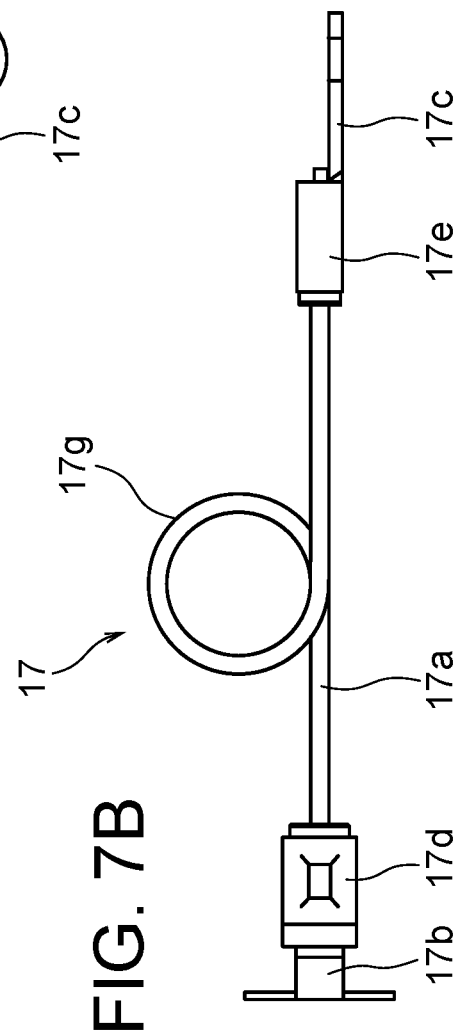
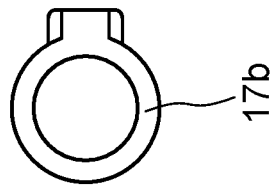

STEERING APPARATUS

TECHNICAL FIELD

The present invention pertains to a steering apparatus mounted in an automobile and other equivalent vehicles, and more particularly to a technology of ensuring an electrifying path for electrical components equipped in a steering wheel.

BACKGROUND ART

In recent years, the automobiles have widely adopted a steering apparatus configured so that a steering column constructed to include two components, i.e., an inner column and an outer column, becomes collapsible to absorb a secondary collision energy in order to relieve an impact exerted on a driver upon the secondary collision with the steering wheel in case of an accident. In this type of steering apparatus, the inner column and the outer column relatively slide on each other in the axial direction, whereby the steering wheel moves toward the front of the vehicle, and an energy absorbing means provided between the inner column and the outer column absorbs the secondary collision energy.

For example, in the steering apparatus described in Patent document 1, the outer column disposed on a lower side is secured to a vehicle body through a tilt bracket and a tilt pivot, and a clamp mechanism clamps the outer column to thereby hold the inner column disposed on an upper side. In this steering apparatus, an ingression-enabled quantity of the inner column into the outer column is set larger than a telescopic adjustment stroke, in which the inner column moves to the front side of the vehicle while resisting a clamp frictional force of the clamp mechanism upon the secondary collision.

What is required of this steering apparatus is to smoothly absorb a secondary collision energy generated when a driver having a light weight collides with the steering wheel. To fulfill this requirement, it is considered to reduce a clamping force of the clamp mechanism; however, with the clamping force being decreased, the force of holding the inner column decreases, resulting in a backlash that is easy to occur at a fitting portion between the inner column and the outer column. Such being the case, according to Patent document 1, a low friction material treatment instanced by coating is applied over an outer peripheral surface of the inner column or an inner peripheral surface of the outer column, thereby reducing the clamping friction force without decreasing the clamping force.

In a telescopic type steering apparatus, the steering shaft is generally configured to include an inner shaft and an outer shaft, which are spline-joined within the steering column in order to render a transfer of a steering torque and a telescopic adjustment compatible with each other. In this case, resin coating is often applied to one of two splines, i.e., a male spline and a female spline, for preventing emission of backlash noises due to a minute gap between the male spline and the female spline.

DOCUMENT OF PRIOR ART

Patent Document

Patent document 1: International Publication WO2004/000627

SUMMARY OF THE INVENTION

Problems to be Solved by the Invention

The steering wheel of an automobile is equipped with electrical components instanced by a horn and an airbag, and an electrifying path leading to the vehicle body from the steering wheel needs to be ensured because of a majority of these electrical components being of a vehicle body earth type.

However, as described above, when the low friction material coating is applied over the inner peripheral surface of the outer column or the outer peripheral surface of the inner column, the coating makes difficult electrification through the electrifying path via a contact surface between the inner column and the outer column. Further, the resin coating is applied to a spline-fitted portion of the steering shaft, in which case the resin coating makes difficult the electrification through the electrifying path via the spline-fitted portion.

It is an object of the present invention, which was devised in view of the problems given above, to provide a steering apparatus configured to ensure anew electrifying path leading to a vehicle body from a steering wheel.

Means for Solving the Problems

For solving the problems described above, the present invention provides a steering apparatus including: a steering shaft having a conductive property and transferring a steering force; an outer column having a conductive property supporting the steering shaft rotatably; an inner column having a conductive property, being fitted in the outer column to enable a relative movement in an axial direction and supporting the steering shaft rotatably together with the outer column; a bracket having a conductive property, retaining the outer column and being fixed to a vehicle body; and an electrifying lead having a conductive property and configuring a part of an electrifying path leading to the vehicle body from the inner column. This configuration enables a new electrifying path to be ensured, which extends from the steering wheel to a vehicle body.

Preferably, the outer column is formed therethrough in a radial direction with a guide groove extending in the axial direction, and the electrifying lead is connected through the guide groove. With this configuration, it is feasible to relatively shorten the electrifying lead and reduce a space for disposing the electrifying lead.

Preferably, the steering apparatus further includes: a guide member being received within the guide groove and attached to the inner column; and a fixing means having a conductive property and fixing the guide member to the inner column, wherein one end of the electrifying lead is fixed to the inner column by the fixing means. This configuration enables the electrifying lead to be easily fitted.

Preferably, the other end of the electrifying lead is connected to the bracket. The electrifying path can be thereby surely configured in a way that facilitates the fitting of the electrifying lead.

Preferably, the other end of the electrifying lead is connected to the outer column. The electrifying path can be thereby surely configured in a way that facilitates the fitting of the electrifying lead.

Preferably, the fixing means has a bolt, and the electrifying lead includes an annular portion receiving insertion of a screw shaft of the bolt. The electrifying lead can be thereby fitted further easily.

The electrifying lead is fixed to the inner column via an electrifying terminal fixed to the inner column by the fixing means. The electrifying lead can be thereby fitted more easily.

Preferably, the electrifying lead includes a rising portion rising outward in the radial direction of the inner column. This configuration can prevent the electrifying lead and peripheral members from interfering with each other.

Preferably, the bracket includes an upper plate being disposed upward of the outer column, the rising portion is disposed upward of the outer column, and the upper plate has a recessed portion being recessed in the axial direction to avoid interfering with the electrifying lead. This configuration can easily prevent the electrifying lead and the bracket from interfering with each other.

Preferably, a low friction material is coated over an inner peripheral surface of the outer column or an outer peripheral surface of the inner column. This configuration reduces a frictional force caused between the inner column and the outer column, and enables an impact to be absorbed even when the impact of the secondary collision is small.

Preferably, the steering shaft is configured to include an upper steering shaft disposed on a rear side of a vehicle and a lower steering shaft disposed on a front side of the vehicle and fitted to the upper steering shaft, and resin coating is applied to the upper steering shaft or the lower steering shaft at the fitted portion. With this configuration, it is feasible to prevent occurrence of a backlash at the fitting portion between the upper steering shaft and the lower steering shaft.

Preferably, the relative movement in the axial direction between the inner column and the outer column is enabled when making a telescopic adjustment and upon a secondary collision, and the electrifying lead has a length sufficient for configuring a part of the electrifying path at least in an adjustment range of the telescopic adjustment and in a movement range upon the secondary collision. With this configuration, without depending on a change in position of the inner column due to the telescopic adjustment, and even after the secondary collision, at least the electrifying path of the steering column can keep function of electrical components instanced by a horn.

Effect of the Invention

According to the present invention, it is feasible to provide the steering apparatus ensuring the new electrifying path leading to the vehicle body from the steering wheel.

BRIEF DESCRIPTION OF THE DRAWINGS

FIGS. 7A, 7B and 7C are views of an electrifying lead, as showed in 3 views, of the steering apparatus according to the first embodiment; FIG. 7A illustrates a left end portion of the electrifying lead in FIG. 7B as viewed from leftward;

FIG. 7B depicts the whole electrifying lead; and FIG. 7C illustrates a state of a right end portion of the electrifying lead in FIG. 7B as viewed from upward.

FIG. 9A illustrates the whole electrifying lead; and FIG. 9B illustrates a state of the right end portion of the electrifying lead in FIG. 9A as viewed from upward.

FIG. 10A is a plan view; FIG. 10B is a side view as viewed from a left side of a vehicle body; and FIG. 10C is a side view as viewed from the rear of the vehicle body.

MODE FOR CARRYING OUT THE INVENTION

In-depth descriptions of embodiments and partially modified examples thereof will hereinafter be made with reference to the drawings, the configuration being such that the present invention is applied to a steering apparatus used for a rack assist type electric power steering mechanism of a tilt/telescopic adjustment type. In a terminology of the discussion to be made hereafter, the rack assist type electric power steering mechanism is simply termed a "steering mechanism". Note that entering upon descriptions of the steering mechanism and the steering apparatus, a front-rear direction, a right-left direction and an up-down direction are indicated by arrow lines throughout the drawings, and positions and directions of respective members are explained along with these directional arrow lines. These directions are coincident with directions of a vehicle in a state of being mounted with the steering apparatus.

First Embodiment

Whole Configuration

Figure 1:
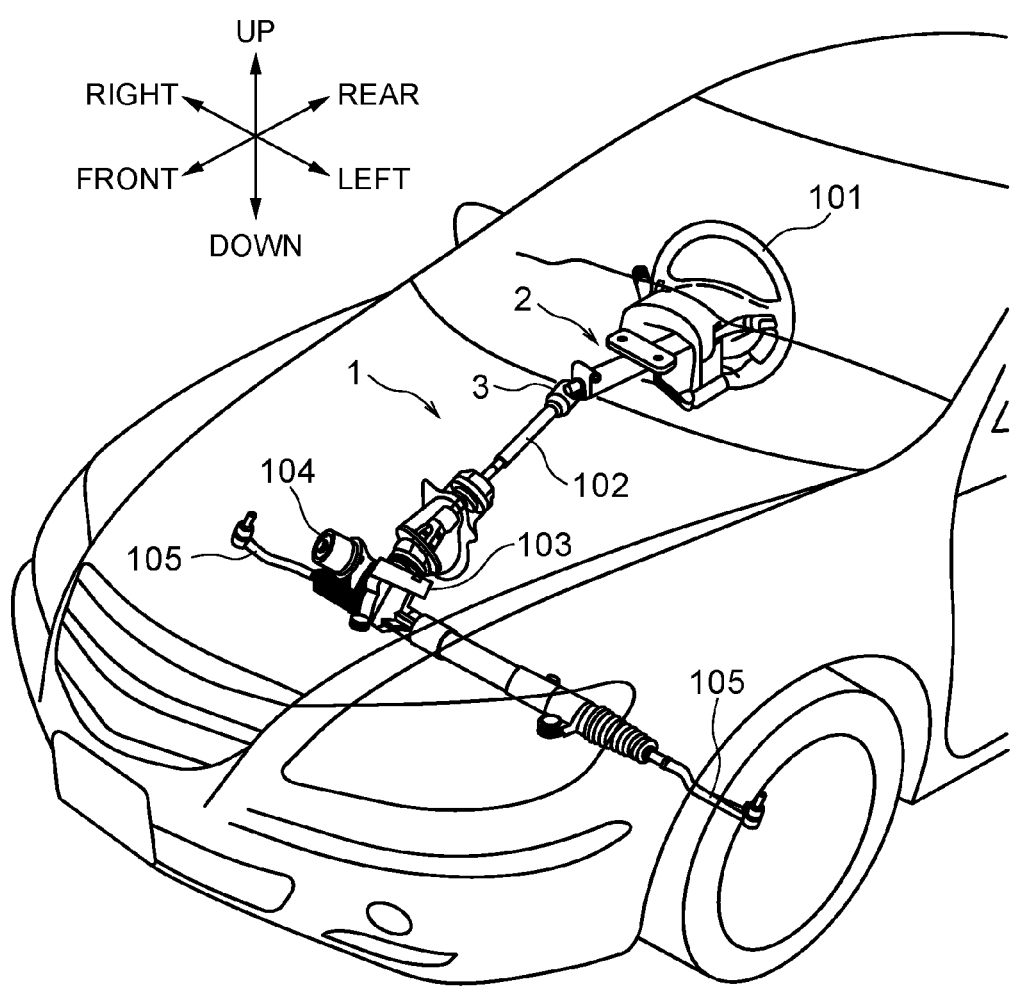
FIG. 1 is a perspective view of a steering mechanism using a steering apparatus according to a first embodiment as viewed from forward in a leftward oblique direction.

FIG. 1 is a perspective view of a steering mechanism 1, as viewed from obliquely forward, using a steering apparatus 2 according to a first embodiment of the present application. As illustrated in FIG. 1, the steering apparatus 2 according to the first embodiment steers front wheels via right and left tie rods 105 joined to an unillustrated rack by reciprocating the rack in the right-left direction in such a manner that an electric assist mechanism 104 assists a steering effort transferred to a steering gear 103 via a steering shaft 3 and an intermediate shaft (lay shaft) 102, which the steering shaft 3 being rotatably supported on a steering column, thereby reducing a force required for operating a steering wheel 101.

Figure 2:
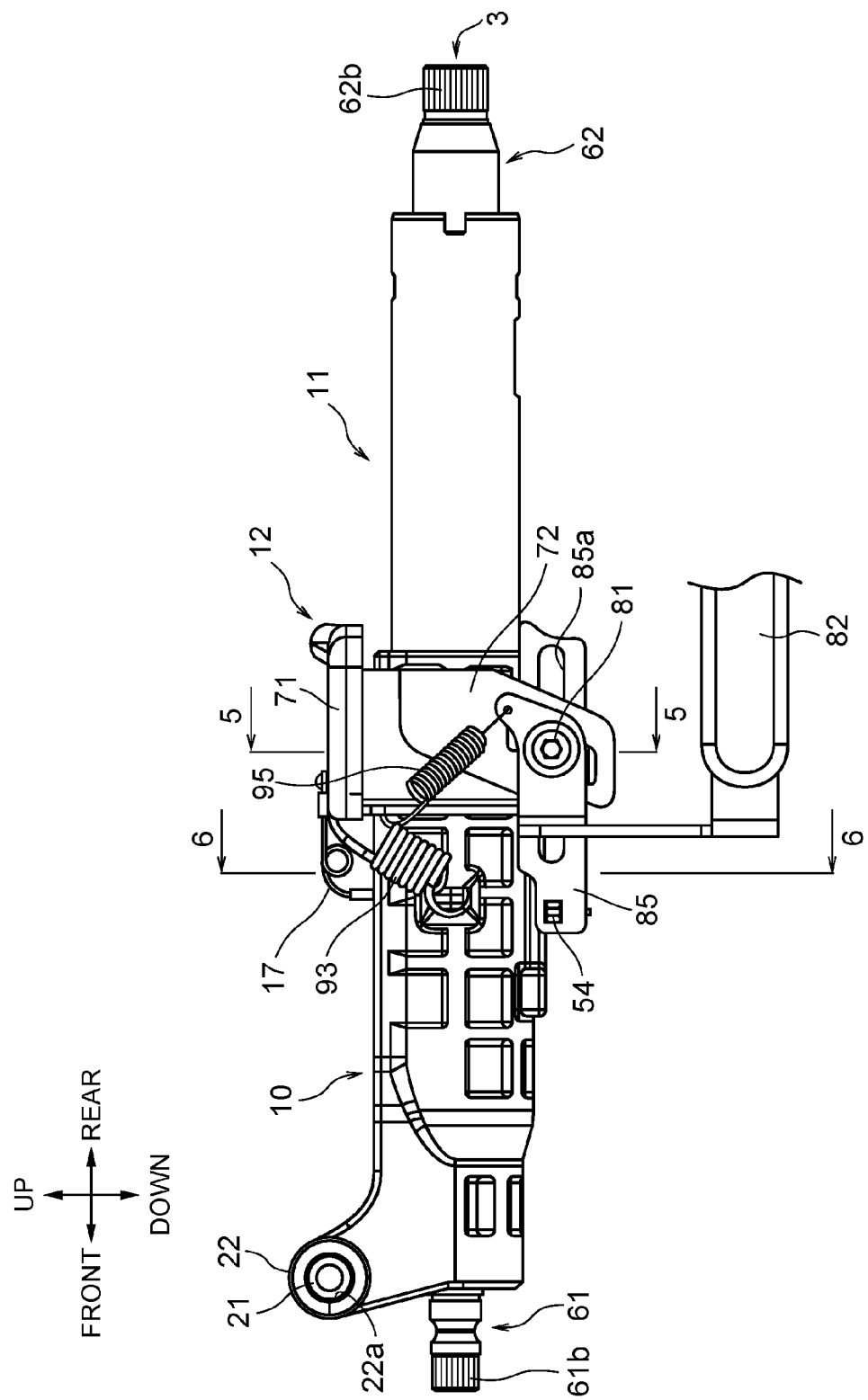
FIG. 2 is a side view of the steering apparatus according to the first embodiment as viewed from a left side.

FIG. 2 is a side view of the steering apparatus 2 according to the first embodiment of the present application, as viewed from the left side. As depicted in FIG. 2, the steering apparatus 2 includes, as main components, the steering shaft 3 transferring the steering effort, an outer column 10 building up a front portion of the steering column and being molded in a cylindrical shape by an aluminum-alloy die cast, an inner column 11 building up a rear portion of the steering column and being made of a steel pipe, and a tilt bracket 12 serving to support the outer column 10 on a vehicle body.

Figure 4:
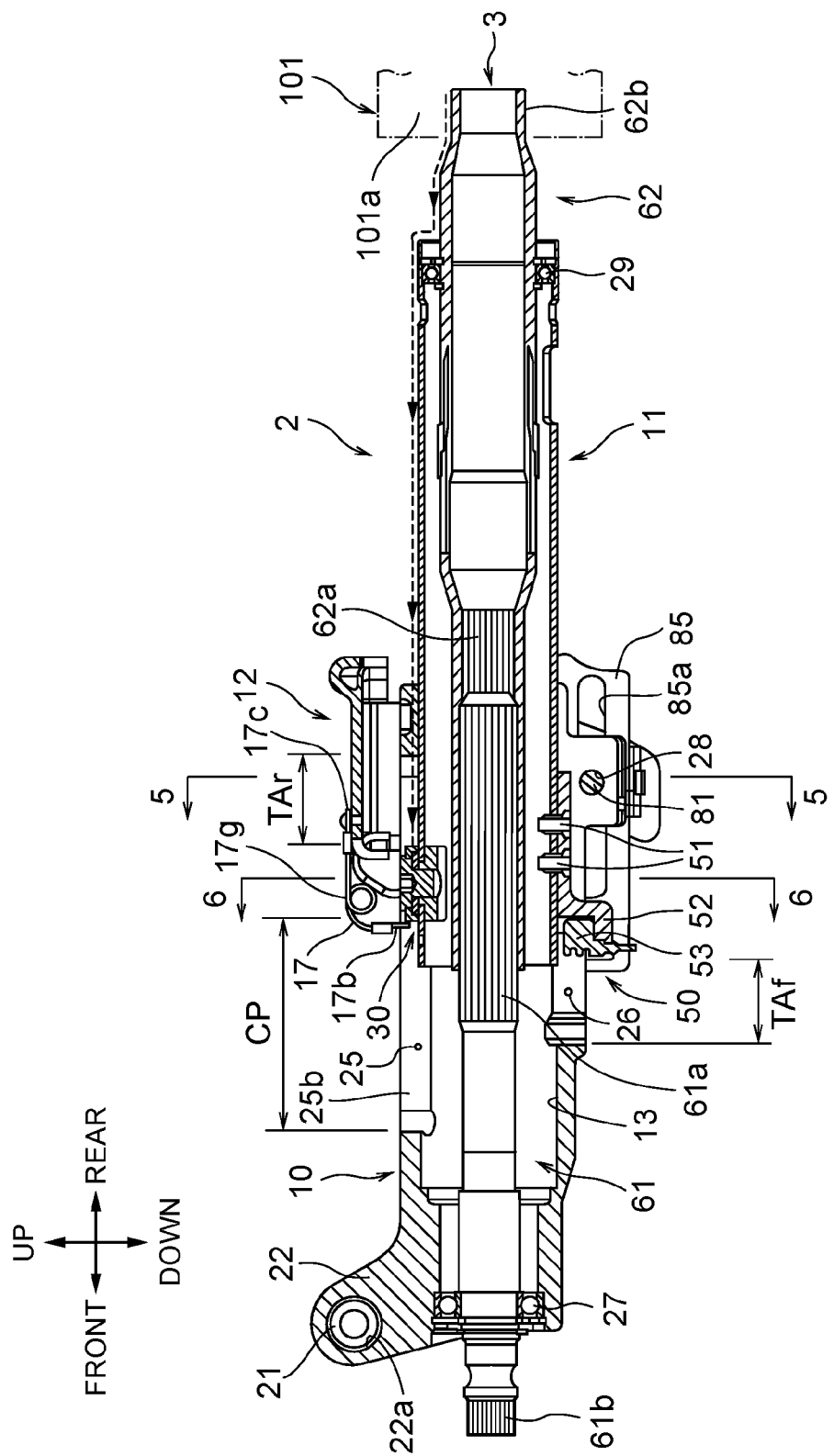
FIG. 4 is a vertical sectional view of the steering apparatus according to the first embodiment.

The outer column 10 has an inner peripheral surface 13 being slightly larger than an outside diameter of the inner column 11 and receiving insertion of the front portion of the inner column 11 from the rear side of the vehicle. FIG. 4 illustrates the inner peripheral surface 13.

The outer column 10 includes a pivot boss 22 holding a collar 21 made of the steel pipe in a boss hole 22a, which extends in the right-left direction through an upper portion of a front end of the outer column 10. The outer column 10 is rotatably fitted to the vehicle body through a pivot bolt inserted into the collar 21.

Figure 3:
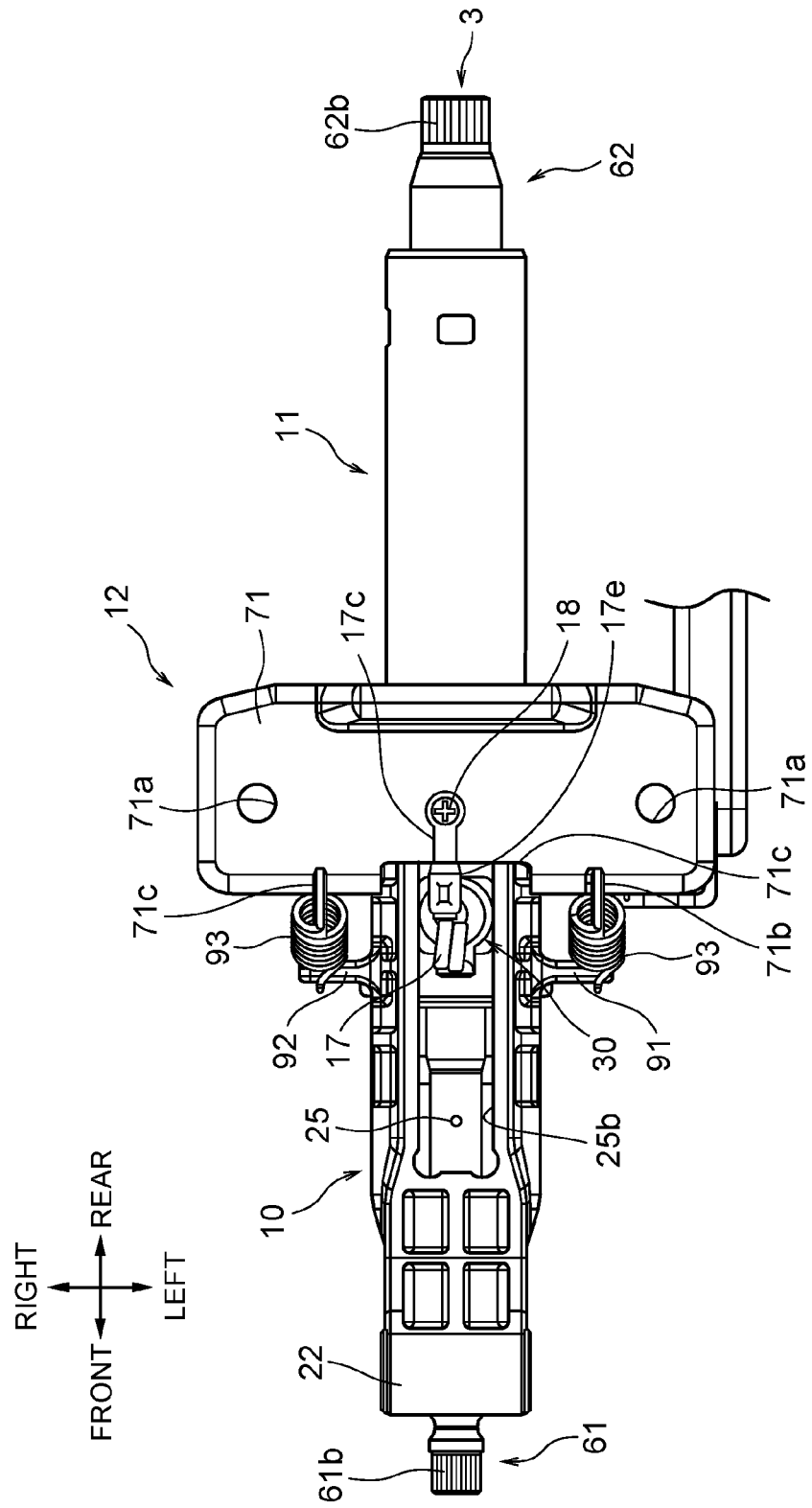
FIG. 3 is a plan view of the steering apparatus according to the first embodiment.

FIG. 3 is a plan view of the steering apparatus 2 according to the first embodiment of the present application. A guide groove 25 extending through the outer column 10 in a radial direction and being elongate in an axial direction is formed in the upper portion of the outer column 10. The guide groove 25 receives an upper stopper 30, which will be described later on, for restricting the inner column 11 from moving and rotating.

The upper stopper 30 and the tilt bracket 12 are electrically connected via an electrifying lead 17.

(Steering Shaft)

FIG. 4 is a vertical sectional view of the steering apparatus 2 according to the first embodiment of the present application. As depicted in FIG. 4, the steering shaft 3 is configured to include a cylindrical lower steering shaft 61 disposed on a front side of the vehicle, and an cylindrical upper steering shaft 62 disposed on a rear side of the vehicle and fitted on the lower steering shaft 61.

The lower steering shaft 61 can be formed by rolling and broaching with a steel round bar used as a material, and includes a male spline 61a formed along an outer periphery of a rear half portion thereof. A serration 61b, on which an unillustrated universal joint is fitted, is formed along a periphery of a front end portion of the lower steering shaft 61. The vehicle front side portion of the lower steering shaft 61 is rotatably supported by a ball bearing 27 fitted inward of a front end portion of the outer column 10.

The upper steering shaft 62 can be formed by rolling and broaching with the steel pipe used as a material, and includes a female spline 62a formed along an inner periphery of a front half portion thereof and fitted to the male spline 61a of the lower steering shaft 61. A serration 62b, on which a boss 101a of the steering wheel 101 is fitted, is formed in a rear end of the upper steering shaft 62. The metallic boss 101a also functions as an earth path for electrical components instanced by a horn switch attached to the steering wheel 101. The vehicle rear side portion of the upper steering shaft 62 is rotatably supported by a ball bearing 29 fitted inward of a rear end portion of the inner column 11. The boss 101a is depicted by a one-dotted chain line in FIG. 4.

The lower steering shaft 61 and the upper steering shaft 62 are spline-joined to make a torque transferable, thereby enabling a relative movement in the axial direction. Resin coating is applied to the male spline 61a of the lower steering shaft 61 to prevent a backlash with the female spline 62a of the upper steering shaft 62. Note that the resin coating may be replaced by coating of a low frictional material.

(Position Adjusting Mechanism)

The steering apparatus 2 is configured to enable a positional adjustment in a rotating direction about a pivot bolt inserted into a pivot boss 22 when secured to the vehicle body and a positional adjustment in the axial direction of the inner column 11 for an adjustment to a driver's physique and other equivalent dimensions. The positional adjustment in the rotating direction about the pivot bolt will hereinafter be called "a tilt adjustment". The positional adjustment in the axial direction of the inner column 11 will hereinafter be called "a telescopic adjustment".

Figure 5:
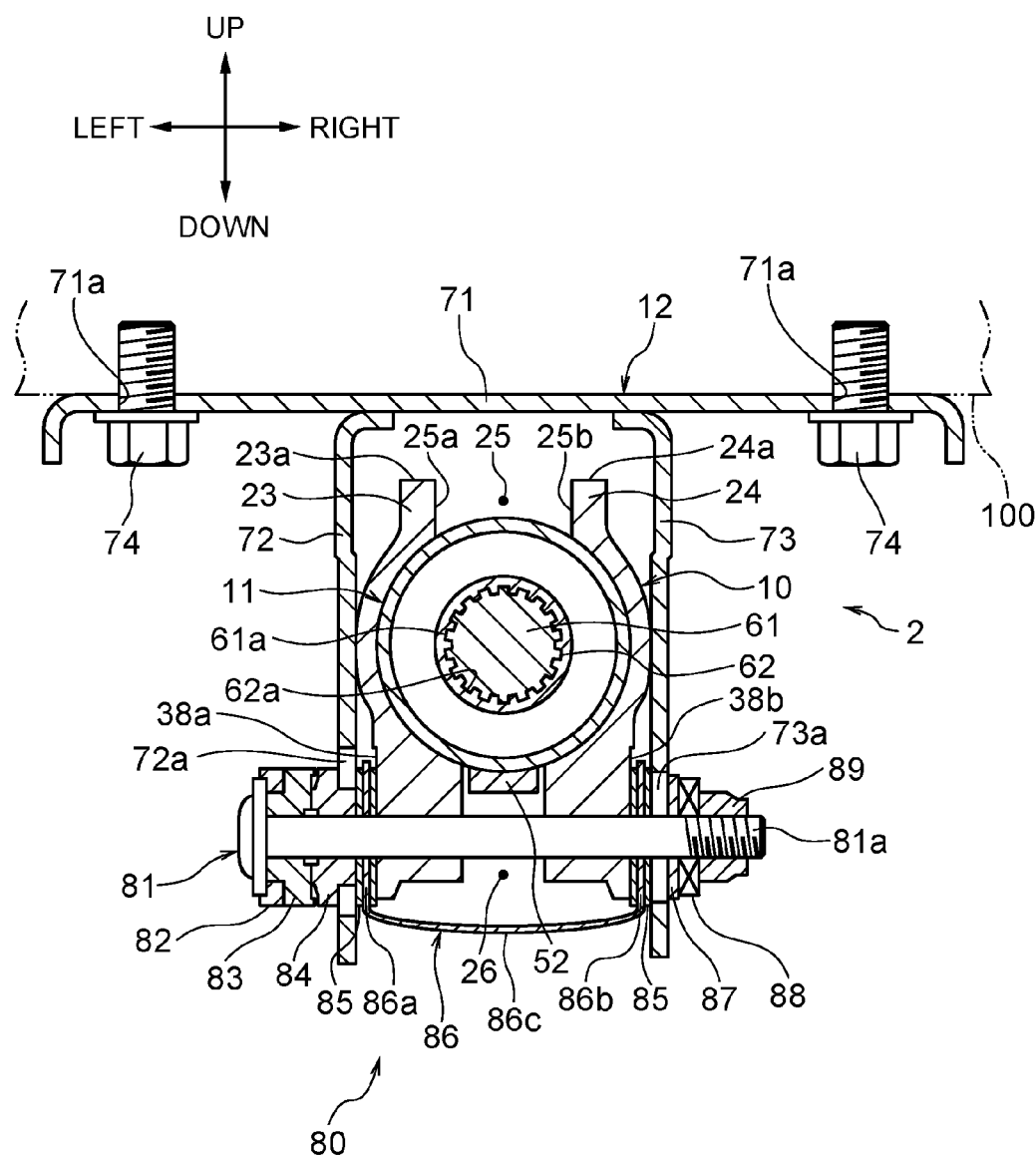
FIG. 5 is a sectional view illustrating a section taken along the line 5-5 in FIGS. 2 and 4.

FIG. 5 is a sectional view illustrating a section taken along the line 5-5 in FIGS. 2 and 4. The inner column 11 is fastened and thus locked by the vehicle rear side portion of the outer column 10 formed with a slit 26 that extends in the front-rear direction of the vehicle and opens on the rear side of the vehicle. This locking is contrived to be unlocked by a driver's operation to enable the telescopic adjustment. The vehicle rear side portion of outer column 10 is clamped by a tilt bracket made of a steel plate from bilateral sides. As stated above, the configuration is such that simultaneously when the driver unlocks the inner column 11 being locked by the outer column 10, the inner column 11 is released from being locked in a vertical direction by the tilt bracket 12, thereby enabling the tilt adjustment. A specific description of this configuration will be made next.

The tilt bracket 12 includes an upper plate 71 extending bilaterally, and a couple of right and left side plates 72, 73 welded to a lower surface of the upper plate 71. The upper plate 71 is fastened to the vehicle body by a bolt 74 inserted into a bolt hole 71a. An interval between the side plates 72 and 73 is set slightly larger than a lateral width of the outer column 10 in a free state. The right and left side plates 72, 73 are formed with tilt adjustment elongate holes 72a, 73a through which a below-mentioned clamp bolt 81 is inserted. Each of the tilt adjustment elongate holes 72a, 73a is formed in a circular arc shape about the pivot bolt described above, and is configured to render the clamp bolt 81 movable upon making the tilt adjustment.

A clamping mechanism 80 for locking the outer column 10 and the inner column 11 by clamping the same columns 10, 11 or unlocking these columns 10, 11 corresponding to the driver's operation, is provided in the periphery of the lower portion of the tilt bracket 12. The clamping mechanism 80 clamps the outer column 10 and the inner column 11 from outward of the couple of right and left side plates 72, 73 of the tilt bracket 12 by using the clamp bolt 81 inserted into the tilt adjustment elongate holes 72a, 73a and a through-hole 28 formed bilaterally through the vehicle lower side portion of the outer column 10, and also using a cam mechanism that will be described later on.

As illustrated in FIG. 5, an operation lever 82, a movable cam 83 and a fixed cam 84 are fitted on the clamp bolt 81 in order from a head side between the tilt bracket 12 and the left side plate 72, in which the operation lever 82 is rotationally operated by the driver, the movable cam 83 rotates integrally with the operation lever 82, and a right portion of the fixed cam 84 engages in a rotation-disabled manner with the tilt adjustment elongate hole 72a. FIGS. 2 and 3 depict an overall image of the operation lever 82. Inclined cam surfaces taking complementary shapes are formed on respective face-to-face surfaces of the fixed cam 84 and the movable cam 83.

When the driver rotates the operation lever 82 on a clamping side, a ridge of the inclined cam surface of the movable cam 83 runs up onto a ridge of the inclined cam surface of the fixed cam 84, thereby pulling the clamp bolt 81 leftward on one hand and pressing the fixed cam 84 rightward on the other hand. This action causes the couple of right and left side plates 72, 73 to clamp a lower portion of the outer column 10 from the bilateral sides to thereby restrict the steering column from moving in a tilt direction, and simultaneously the inner column 11 is restricted from moving in the axial direction by a clamp frictional force generated when the outer column 10 clamps the inner column 11 and by a frictional force generated on a friction plate 85.

Whereas when the driver rotates the operation lever 82 in an unlocking direction, the couple of right and left side plates 72, 73, of which the interval in the free state is larger than the width of the outer column 10 as described above, resiliently return. This action cancels both of the restriction on the tilt-directional movement of the outer column 10 and the restriction on the axis-directional movement of the inner column 11, thereby enabling the driver to adjust the position of the steering wheel 101.

A pressing plate 87 and a thrust bearing 88a are fitted on a front end portion, protruding from the right side plate 73, of the clamp bolt 81. A nut 89 is screwed along a male screw 81a formed along the periphery of the front end portion of the clamp bolt 81.

Run-offs 38a, 38b spaced away from the side plates 72, 73 are formed along the periphery of the clamp bolt 81 in portions of the outer column 10, these portions taking a face-to-face relation with the couple of right and left side plates 72, 73 of the tilt bracket 12. Allocated at the run-offs 38a, 38b are two right and left friction plates 85 fixed to the inner column 11 by a below-mentioned lower stopper 50 and made of the steel plates, and also right and left end plates 86a, 86b configuring end portions of an intermediate friction plate 86 made of the steel plate and being pinched by friction plates 85 from the right and left sides. The friction plates 85 and the intermediate friction plate 86 serve as a reinforcement to hold the inner column 11 by augmenting a friction surface causing the friction force to resist a force applied to move the inner column 11 when locking the inner column 11.

The friction plate 85 is, as illustrated in FIG. 4, elongate in the front-rear direction, and includes an elongate hole 85a, being elongate in the front-rear direction, through which the clamp bolt 81 is inserted. This configuration allows a relative movement between the clamp bolt 81 and the friction plate 85 when canceling the clamping of the clamping mechanism 80, thereby enabling the telescopic adjustment.

The intermediate friction plate 86 has such a configuration that a round hole to permit the insertion of the clamp bolt 81 is formed in a central portion of a square plate member, and lower portions of a couple of right and left end plates 86a, 86b facing each other are connected by a connection plate 86c.

As depicted in FIG. 3, hook portions 91, 92 protruding right and left in a horizontal direction are provided at an intermediate portion in the axial direction of the right and left side surfaces of the outer column 10. Engaging holes 71b, 71c are bored in both of the right and left portions on the front side of the upper plate 71 of the tilt bracket 12. Coil springs 93 are bridged over between the hook portions 91, 92 and the engaging holes 71b, 71c. The coil spring 93 lightens the driver's operation for the tilt adjustment by sharing weights of the steering column and steering wheel 101 and so on when making the tilt adjustment.

As illustrated in FIG. 2, the coil spring 95 is bridged also between the operation lever 82 and the tilt bracket 12. The coil spring 95 applies a preload so as not to cause the backlashes of the fixed cam 84 and the movable cam 83 when unlocking the operation lever 82.

The lower stopper 50 for fixing the friction plate 85 to the inner column 11 is, as illustrated in FIG. 4, attached to the lower surface of the front end of the inner column 11 and received within the slit 26. The friction plate 85 engages with an engaging arm 54 protruding outward of the slit 26 from the bilateral sides of the lower stopper 50. FIG. 2 depicts the engaging arm 54.

As illustrated in FIG. 4, a buffer retaining portion 52 taking substantially an L-shape in a cross section is formed in protrusion directed downward at a front end of the lower stopper 50, and a buffer block 53 is fitted to a front of this buffer retaining portion 52. The buffer block 53 abuts on the portion, on the front side of the slit 26, of the outer column 10 upon making the telescopic adjustment, thereby defining a range of a forward telescopic adjustment of the inner column 11. In FIG. 4, the forward telescopic adjustment range of the inner column 11 is designated by a symbol TAf. The buffer block made of rubber buffers an impact not to damage below-mentioned resin pins 51 even when colliding with the vehicle front side portion of the outer column 10 formed with the slit 26 upon making the telescopic adjustment.

(Impact Absorbing Mechanism)

Resin coating having a low frictional coefficient is applied to an outer peripheral surface of a portion inserted into the outer column 10, of the inner column 11. This coating keeps relatively low a clamp friction force generated when the outer column 10 clamps the inner column 11 even if setting large the clamping force by which the clamp mechanism 80 clamps the outer column 10.

The lower stopper 50 is secured to the inner column 11 by a couple of front and rear resin pins 51. The inner column 11 moves forward due to an impact caused upon a secondary collision, at which time the buffer block 53 attached to the lower stopper 50 collides with the portion, on the front side of the slit 26, of the outer column 10. If the impact caused by this collision is larger than a predetermined magnitude, shear fractures of the resin pins 51 occur, and the inner column 11 releases from the lower stopper 50 and is thereby enabled to move further forward without being restricted in movement by the friction plate 85.

With this configuration, even if the driver having a light weight secondarily collides with the steering wheel 101 upon the collision of the automobile, the steering wheel 101 moves forward relatively easily together with the inner column 11, thus relieving the impact of the secondary collision. The coating of a low frictional material with the low frictional coefficient can keep the low clamp friction force even when decreasing a working accuracy of the inner peripheral surface 13 of the outer column 10, and hence a working cost can be also reduced.

Figure 6:
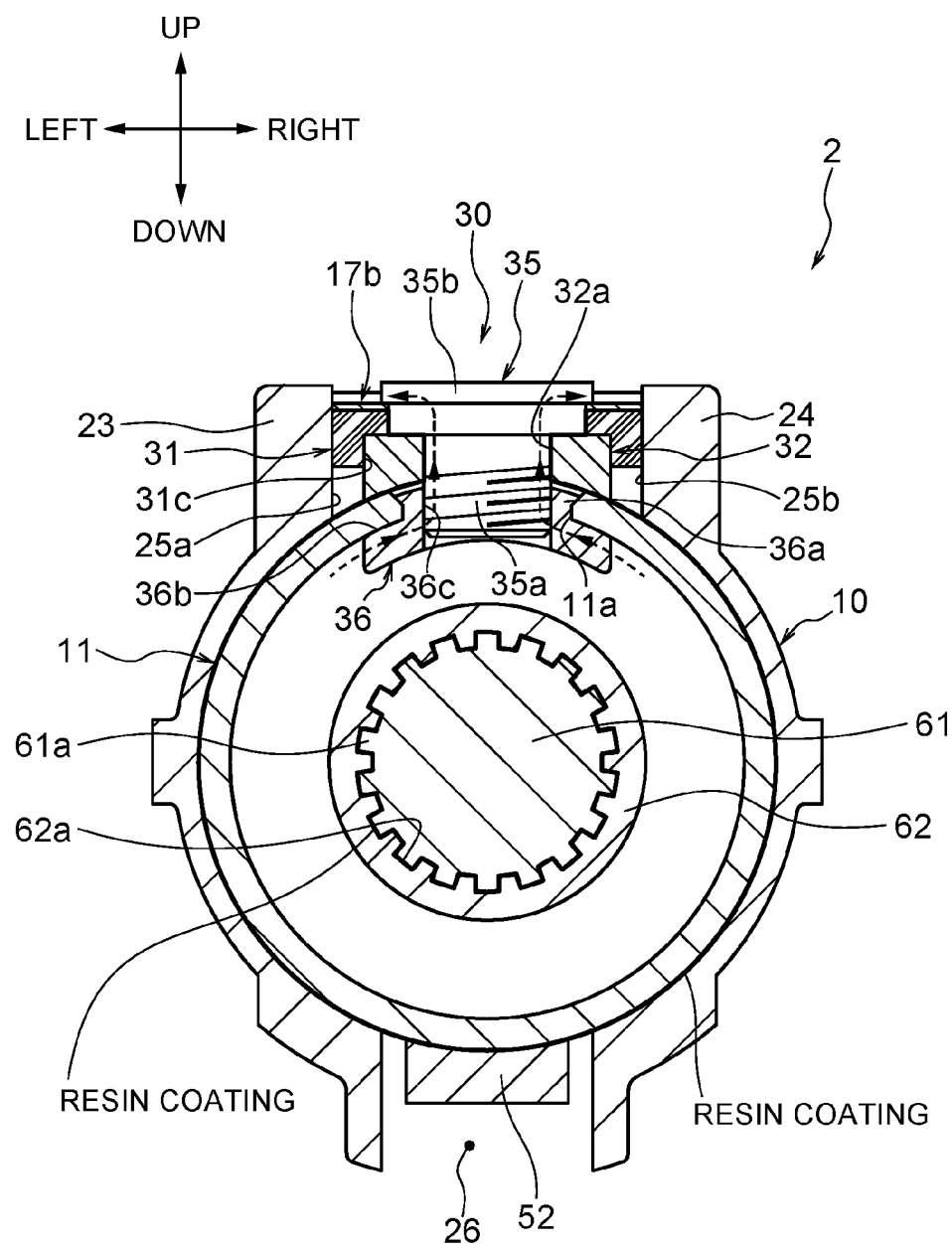
FIG. 6 is a sectional view illustrating a section taken along the line 6-6 in FIGS. 2 and 4.

(Upper Stopper) FIG. 6 is a sectional view illustrating a section taken along the line 6-6 in FIGS. 2 and 4.

As illustrated in FIGS. 4 and 6, the upper portion of the outer column 10 is formed with a couple of right and left guide walls 23, 24 protruding upward and extending in the front-rear direction, and a guide groove 25 extending through the upper portion of the outer column 10 in the radial direction and extending in the front-rear direction is provided between these guide walls. An upper stopper 30 is fixed to the inner column 11.

The upper stopper 30 engages with the walls 23, 24 along the guide groove 25, thereby preventing relative rotations of the outer column 10 and the inner column 11 and defining an axis-directional relative movement range of the inner column 11 and the outer column 10. To be specific, the upper stopper 30 abuts on the vehicle rear side portion of the outer column 10 formed with the guide groove 25 to thereby define a telescopic adjustment range toward the rear of the inner column 11, and abuts on the vehicle front side portion of the outer column 10 formed with the guide groove 25 to thereby define the movement range of the inner column 11 upon the secondary collision. The telescopic adjustment range toward the rear of the inner column 11 is designated by TAr in FIG. 4. The movement range of the inner column 11 upon the secondary collision is designated by CP in FIG. 4.

The upper stopper 30 includes a guide member 31 as a resinous injection-molded product and a metallic stopper base 32, the configuration being such that the guide member 31 and the stopper base 32 are fitted to the inner column 11 by fixing means, i.e., a metallic stepped low head bolt 35 with a hexagon socket and a metallic nut plate 36 secured to the inner column 11.

The guide member 31 takes an oval shape in planar view, and bilateral side surfaces of the guide member 31 are in a face-to-face relation with inner surfaces 25a, 25b of the guide walls 23, 24. A lower portion of the guide member 31 is, as illustrated in FIG. 6, formed with a recessed portion 31c into which the stopper base 32 is fitted. The guide member 31 may be formed of a synthetic resin or other equivalent materials.

The stopper base 32 is, as illustrated in FIG. 6, bored with a through-hole 32a receiving insertion of a screw shaft 35a of the stepped low head bolt 35. The stopper base 32 is kept in surface-contact with the inner column 11 at its lower curved surface having substantially the same curvature as a curvature of the outer peripheral surface of the inner column 11.

The nut plate 36 has, as depicted in FIG. 6, a boss 36a, at the center of the upper surface, inserted into a through-hole 11a formed in the inner column 11, and is formed with a screw hole 36c through the boss 36a from an upper end surface to a lower end. The nut plate 36 including an upper curved surface 36b having substantially the same curvature as a curvature of the inner column 11, and is kept in surface-contact with an inner peripheral surface, not coated with the low friction material, of the inner column 11 as illustrated in FIG. 6. According to the first embodiment, after securing the stopper base 32 to the inner column 11 by caulking the boss 36a in a state of being inserted into the through-hole 11a, a thread groove of the screw hole 36c is formed by using a tap. Note that the upper stopper 30 may also be fastened to the inner column 11 by a blind rivet in place of the nut plate 36, and another available configuration is that the through-hole 11a of the inner column 11 is threaded to thereby fasten the stepped low head bolt 35.

(Electrifying Path)

According to the first embodiment, an electrifying path leading to the vehicle body is ensured via the upper steering shaft 62, the ball bearing 29, the inner column 11, the nut plate 36, the stepped low head bolt 35, the electrifying lead 17 and the tilt bracket 12 from the steering wheel 101.

In the electrifying path, the upper steering shaft 62, the ball bearing 29 and the inner column 11 are each formed of a metallic material having a predetermined electrical conductivity, and are brought into contact with each other, thereby ensuring the electrifying path indicated by a broken arrow line in FIG. 4. Given below is an in-depth description of the electrifying path extending from the inner column 11 to the tilt bracket 12.

As illustrated in FIG. 4, the upper stopper 30 and the tilt bracket 12, which are fitted to the inner column 11, are electrically connected via the electrifying lead 17.

FIGS. 7A, 7B and 7C are views of the electrifying lead 17 as shown in 3 views, in which FIG. 7A illustrates a left end portion of the electrifying lead 17 in FIG. 7B as viewed from leftward; FIG. 7B depicts the whole electrifying lead 17; and FIG. 7C illustrates a state of a right end portion of the electrifying lead 17 in FIG. 7B as viewed from upward.

The electrifying lead 17, as illustrated in FIGS. 7A, 7B and 7C, includes: a lead wire 17a; a first fixed portion 17b secured to one end of the lead wire 17a; a second fixed portion 17c secured to the other end of the lead wire 17a; a first caulking portion 17d for fixing the lead wire 17a and the first fixed portion 17b together; and a second caulking portion 17e for fixing the lead wire 17a and the second fixed portion 17c together. As illustrated in FIG. 4, the first fixed portion 17b is fixed to the upper stopper 30, while the second fixed portion 17c is fixed to the tilt bracket 12.

The lead wire 17a can be formed of a material instanced by copper having a conductive property, and has a length enabling an electrical connection between the upper stopper 30 and the tilt bracket 12 even in a state where the upper stopper 30 moves up to a forwardmost point of the movement range CP illustrated in FIG. 4 upon the secondary collision. Accordingly, the lead wire 17a is, as depicted in FIG. 4, formed with a flexural portion 17g as illustrated in FIG. 4 at a normal time with no occurrence of the secondary collision. According to the first embodiment, the flexural portion 17g may, though formed in an annular shape, be formed in, e.g., a spiral shape without being limited to the annular shape and is thereby enabled to save a space. With the space being ensured, the lead wire 17a may simply be largely curved. The lead wire 17a can be coated with a coating material instanced by the resin, vinyl or the like.

The first fixed portion 17b is a punching press molded product of a metal plate formed separately from the lead wire 17a, and includes an annular portion and a connecting portion protruding outward in the radial direction from the annular portion and folded in a direction of central axis line of the annular portion. The connecting portion keeps touching the lead wire 17a and is fixed thereto the lead wire 17a by the first caulking portion 17d formed by caulking a cylindrical metal member.

The first fixed portion 17b is, as illustrated in FIG. 6, fixed to the upper stopper 30 by inserting the stepped low head bolt 35 into the annular portion with the result that the annular portion is pinched between the guide member 31 and an upper stepped portion 35b of the stepped low head bolt 35. The first fixed portion 17b has the connecting portion folded at a right angle as described above, and, as illustrated in FIG. 4, the connecting portion is fixed as a rising portion with directivity rising upward on the vehicle front side of the upper stopper 30. This configuration prevents the electrifying lead from interfering with other members when making the telescopic adjustment or upon the secondary collision.

The second fixed portion 17c is a punching press molded product of a steel plate formed separately from the lead wire 17a, and includes an annular portion and a connecting portion extending outward in the radial direction from the annular portion. The connecting portion keeps touching the lead wire 17a and is fixed thereto the lead wire 17a by the second caulking portion 17e formed by caulking a cylindrical metal member.

The second fixed portion 17c is, as illustrated in FIG. 3, fixed to an upper central portion of the tilt bracket 12 by a screw 18 with the second caulking portion 17e directed to be located on the front side of the vehicle.

The upper plate 71 is, though its peripheral portion, as illustrated in FIGS. 2 and 4, takes a downward curved shape for the reinforcement, provided with a recessed portion 71c recessed toward the rear of the vehicle in order to prevent the connecting portion of the first fixed portion 17b, the first caulking portion 17d and the lead wire 17a from interfering with the tilt bracket 12 without providing the curved portion at the front central portion of the upper plate 71 as depicted in FIG. 3.

With the configuration described above, as indicated by the broken arrow line in FIG. 6, the electrifying path is configured to extend from the inner column 11 continuously to the nut plate 36, the stepped low head bolt 35, the electrifying lead 17 and the tilt bracket 12 in this sequence.

Second Embodiment

The steering apparatus 2 according to a second embodiment of the present application will next be described with reference to FIG. 8. The steering apparatus 2 according to the second embodiment has substantially the same configuration as the steering apparatus 2 according to the first embodiment has, except an arrangement of the electrifying lead. Therefore, in the discussion on the following second embodiment, the components corresponding to those of the steering apparatus 2 according to the first embodiment are marked with the same numerals and symbols, and repetitive explanations thereof are omitted.

Figure 8:
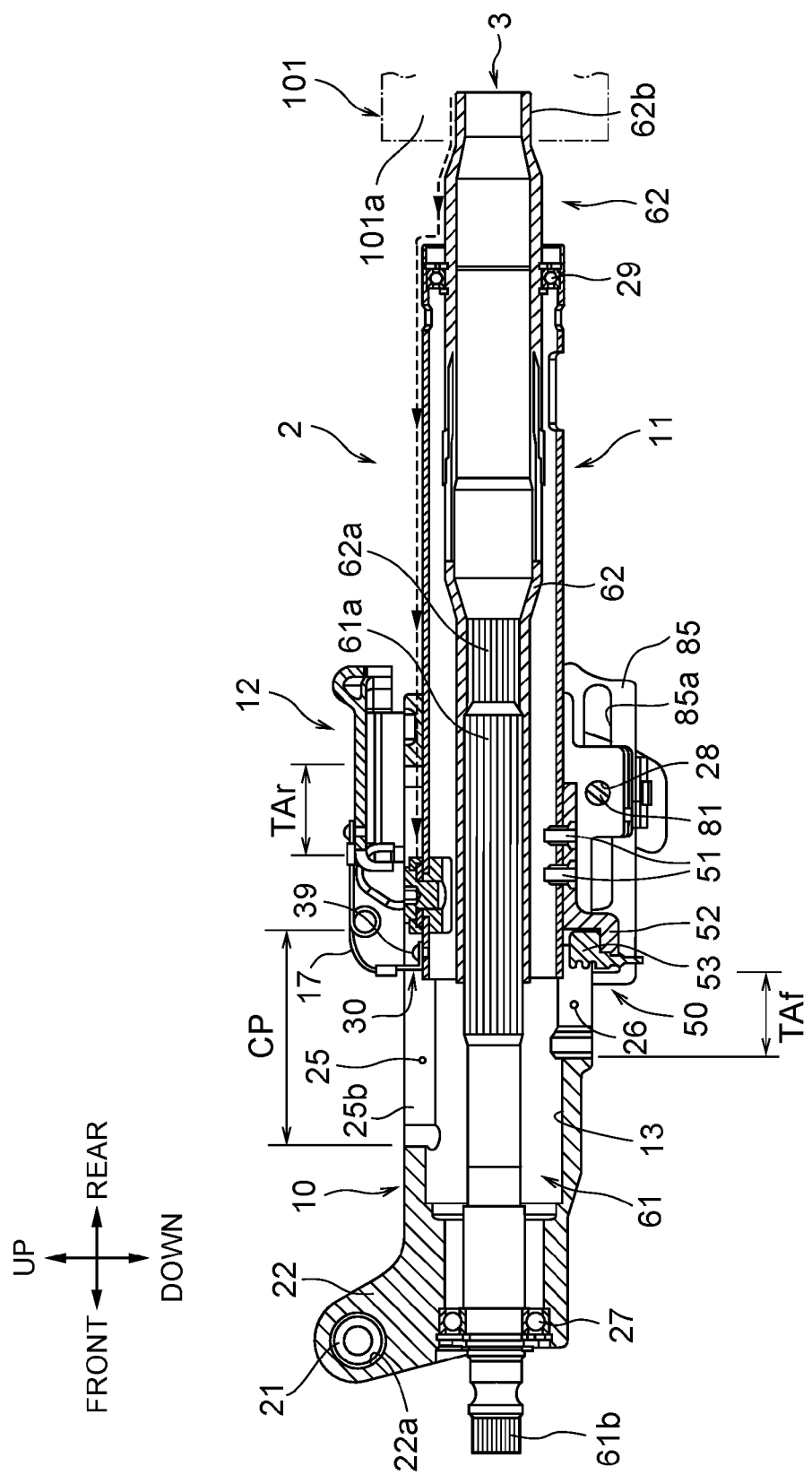
FIG. 8 is a vertical sectional view of the steering apparatus according to a second embodiment.

The electrifying lead 17 according to the second embodiment establishes, as illustrated in FIG. 8, the electrical connection between the tilt bracket 12 and the inner column 11. The electrifying lead 17 is electrically connected to the inner column 11 by screw-fastening the annular portion formed on the first fixed portion 17b to the inner column 11. The annular portion of the first fixed portion 17b of the electrifying lead 17 according to the second embodiment is smaller in diameter than the annular portion of the first embodiment but has the same diameter as the diameter of the annular portion of the second fixed portion 17c, and is fixed to the inner column 11 by a screw 39 in the same way as the second fixed portion 17c is. The portion, fitted with the first fixed portion 17b, of the inner column 11 can be made conductive by performing a masking process when applying the low friction material coating over the outer periphery of the inner column 11. Note that the connection to the tilt bracket 12 is the same as in the first embodiment.

The first embodiment simplifies a labor of securing the first fixed portion 17b to the steering apparatus 2 in a way that joins the first fixed portion 17b and the guide member 31 together by the stepped low head bolt 35. By contrast, the second embodiment, which has a configuration of securing the first fixed portion 17b separately from the guide member 31, therefore takes a more labor for securing than the first embodiment but is enabled to further ensure the electrifying path leading to the tilt bracket 12 from the inner column 11 by establishing a direct connection between the inner column 11 and the tilt bracket 12.

Third Embodiment

The steering apparatus according to a third embodiment of the present application will next be described with reference to FIGS. 9A, 9B, 10A, 10B and 10C. The steering apparatus according to the third embodiment has substantially the same configuration as the steering apparatus 2 according to the first embodiment has, except a configuration peripheral to the electrifying lead on the side of the inner column. Therefore, in the discussion on the following third embodiment, the components corresponding to those of the steering apparatus 2 according to the first embodiment are marked with the same numerals and symbols, the repetitive explanations thereof are omitted.

Figure 9B:
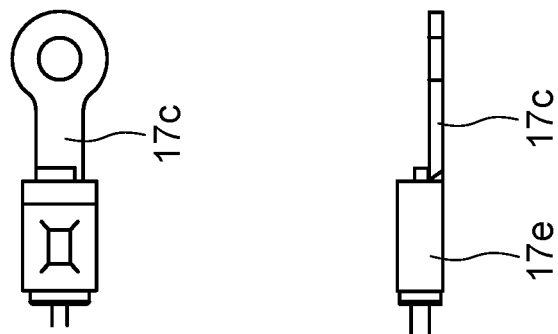
FIGS. 9A and 9B are views of the electrifying lead, as shown in 2 views, of the steering apparatus according to a third embodiment.
Figure 9A:
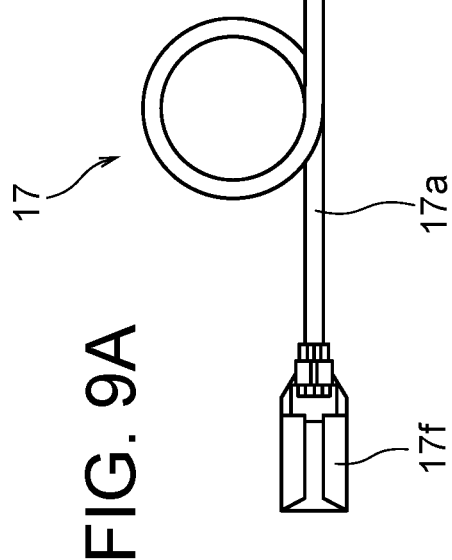
Figure 10A:
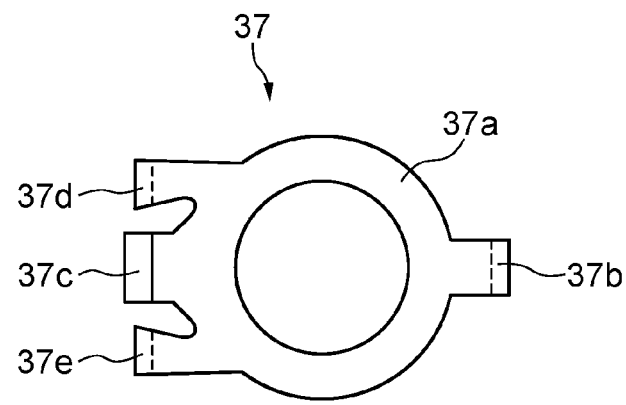
FIGS. 10A, 10B and 10C are views of the electrifying lead of the steering apparatus according to the third embodiment.
Figure 10B:
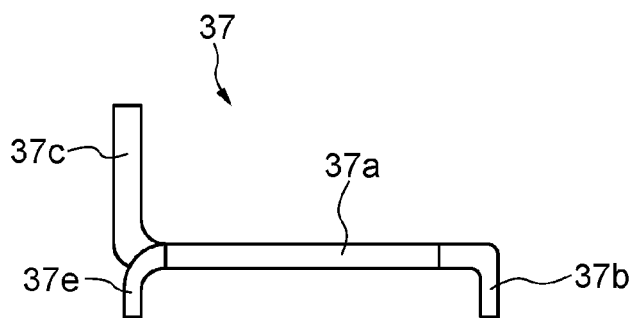
Figure 10C:
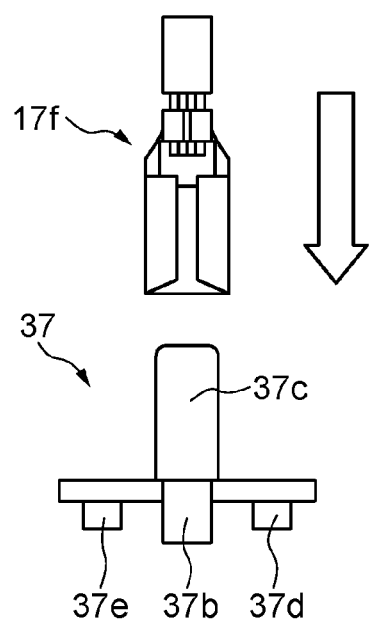

FIGS. 9A and 9B are views of the electrifying lead 17 of the steering apparatus according to the third embodiment as shown in 2 views. FIG. 9A illustrates the whole electrifying lead 17, and FIG. 9B depicts a right end portion of the electrifying lead 17 in FIG. 9A as viewed from upward. FIGS. 10A, 10B and 10C are views each illustrating an electrifying terminal 37 of the steering apparatus according to the third embodiment. FIG. 10A is a plan view; FIG. 10B is a side view as viewed from a left side of a vehicle body; and FIG. 10C is a side view as viewed from the rear of the vehicle body.

In the first embodiment, the electrifying lead 17 includes the first fixed portion 17b, and the first fixed portion 17b is fixed to the inner column 11 in a way that joins the first fixed portion 17b and the guide member 31 together by the stepped low head bolt 35. By contrast, according to the third embodiment, a portion corresponding to the first fixed portion 17b is formed as the electrifying terminal 37 illustrated in FIGS. 10A, 10B, 10C and is configured as a member separate from the electrifying lead 17. As depicted in FIGS. 9A and 9B, a plug type connection terminal 17f, which will be described later on, is connected to the end of the electrifying lead 17 on the side of the electrifying terminal 37, and is fitted to the electrifying terminal 37 as illustrated in FIG. 10C.

The electrifying terminal 37, which is a punching press molded product of the metal plate, includes, as illustrated in FIGS. 10A, 10B and 100, an annular portion 37a; a rotation stopper 37b protruding toward the rear of the vehicle from a vehicle rearmost side portion of the annular portion 37a and bent downward at 90°; a tab terminal 37c protruding toward the front of the vehicle from a vehicle forwardmost side portion of the annular portion 37a and bent upward at 90°; and rotation stoppers 37d, 37e protruding toward the front of the vehicle respectively on the bilateral sides of the tab terminal 37c and bent downward at 90°. Upon disposing the electrifying terminal 37 on the guide member 31, the rotation stoppers 37b, 37d, 37e are brought into contact with surfaces, on the rear and front sides of the vehicle, of the guide member 31. When fastening the stepped low head bolt 35, the electrifying terminal 37 is thereby disabled from rotating and is fixed to the inner column 11 in a desired direction.

The plug type connection terminal 17f is fitted from upward onto the tab terminal 37c of the electrifying terminal 37 fixed to the inner column 11. The plug type connection terminal 17f includes a couple of curved portions so curved as to be rolled inward from the bilateral sides on the rear side of the vehicle, and the tab terminal 37c is inserted in between the couple of curved portions and the rear surface portion on the front side of the vehicle. The configurations of the tab terminal 37c being bent upward at 90° and the plug type connection terminal 17f being fitted from upward, can prevent the electrifying lead 17 from interfering with other members when making the telescopic adjustment or upon the secondary collision.

According to the third embodiment, it is feasible to configure the electrifying path extending from the inner column 11 to the tilt bracket 12 in continuation similarly to the first embodiment.

Fourth Embodiment

Figure 12:
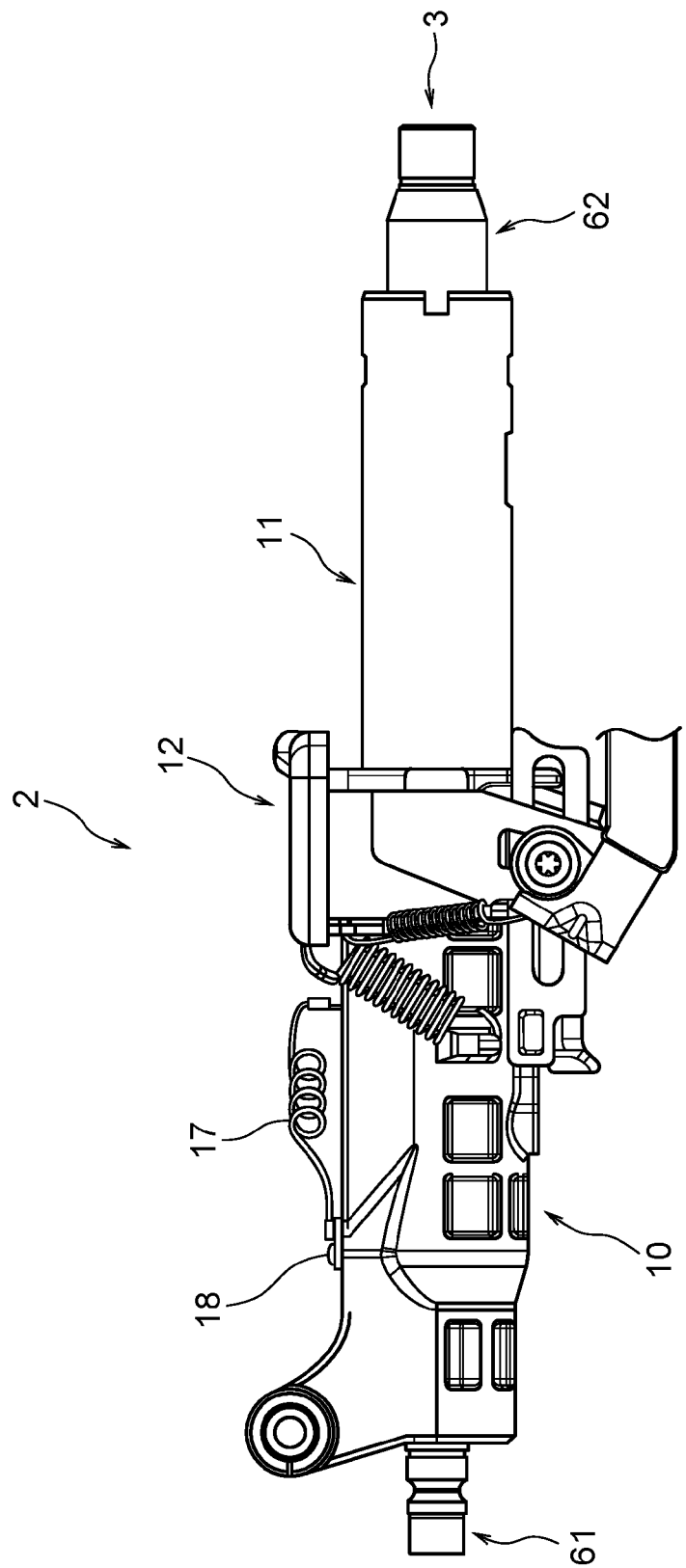
FIG. 12 is a side view of the steering apparatus according to the fourth embodiment.
Figure 13:
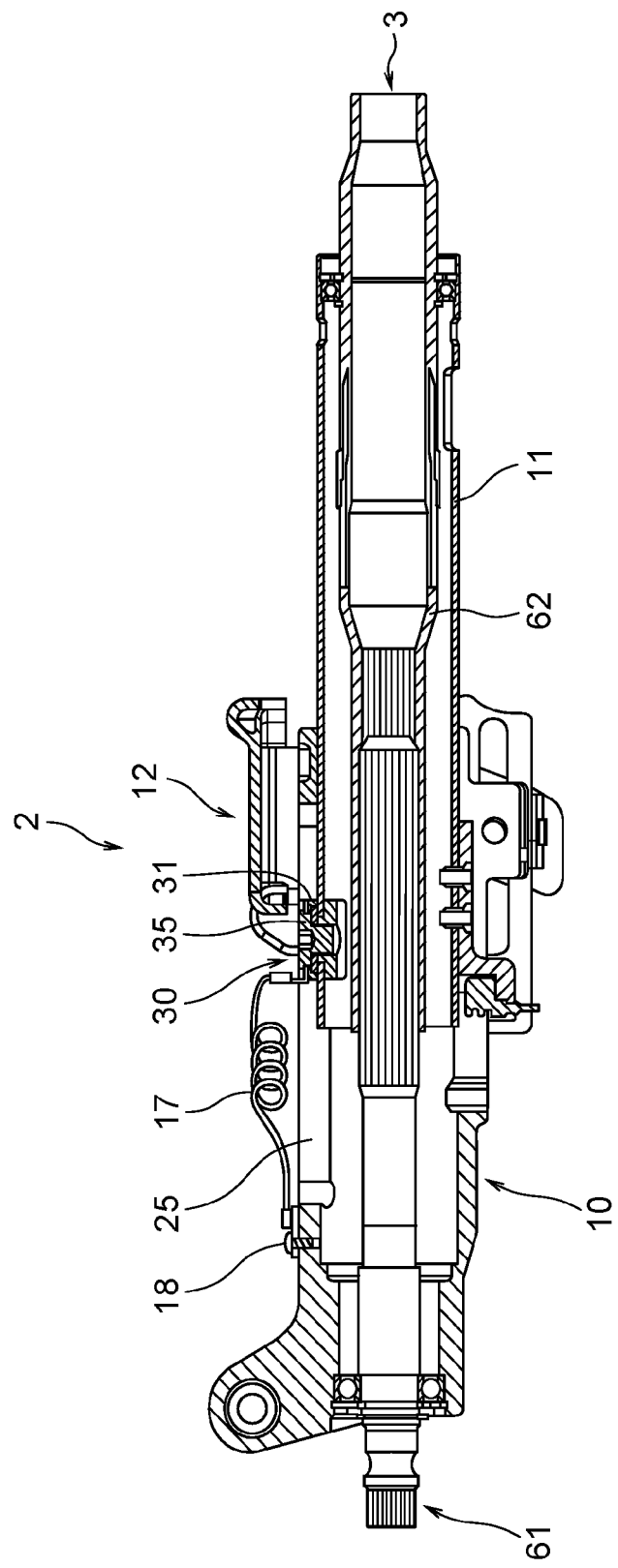
FIG. 13 is a side view of the steering apparatus according to the fourth embodiment.

The steering apparatus according to a fourth embodiment of the present application will next be described with reference to FIGS. 11 through 13. The steering apparatus according to the fourth embodiment has substantially the same configuration as the steering apparatus 2 according to the first embodiment has, except a configuration peripheral to the electrifying lead. Therefore, in the discussion on the following fourth embodiment, the components corresponding to those of the steering apparatus 2 according to the first embodiment are marked with the same numerals and symbols, the repetitive explanations thereof are omitted.

Figure 11:
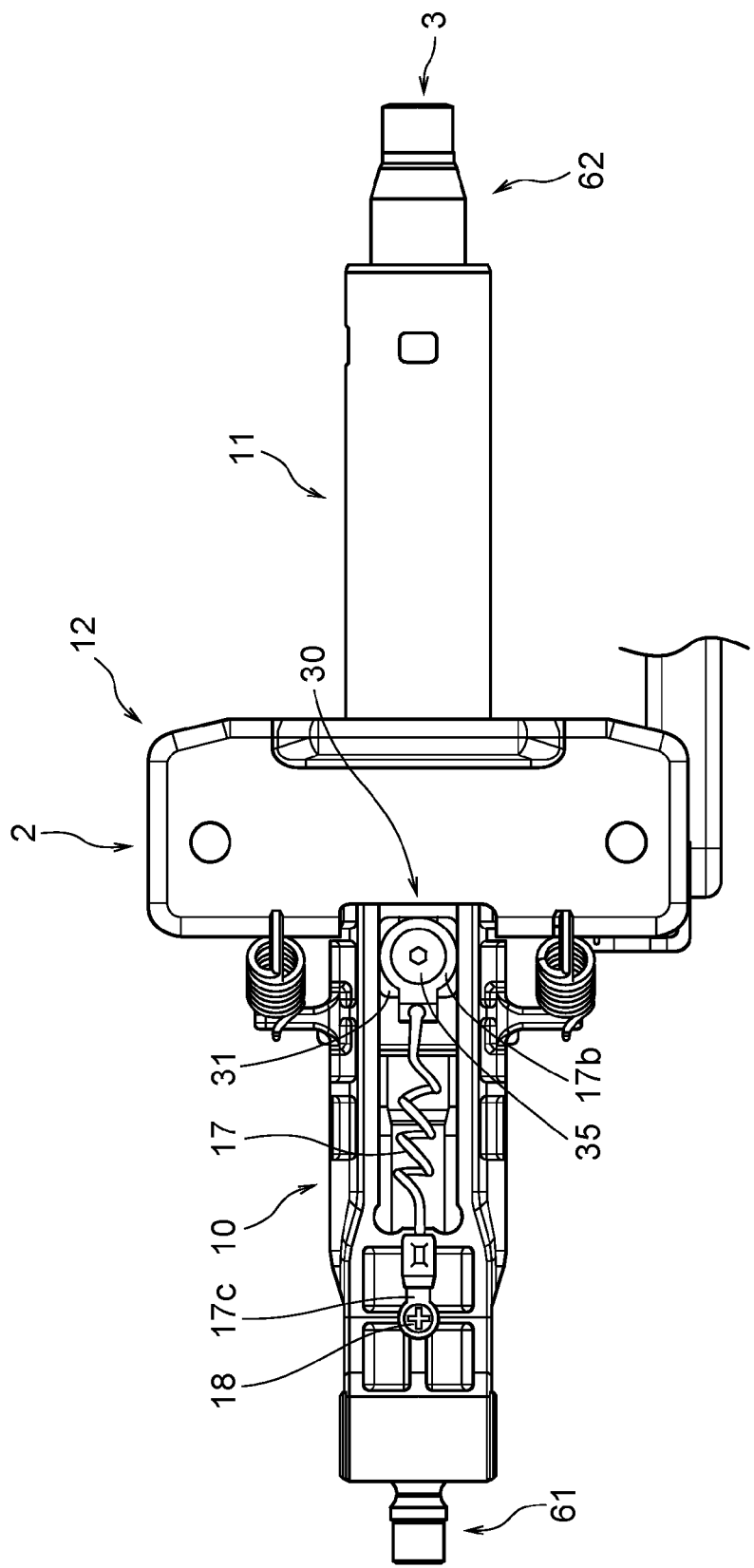
FIG. 11 is a plan view of the steering apparatus according to a fourth embodiment.

FIG. 11 is a plan view of the steering apparatus 2 according to the fourth embodiment; FIG. 12 is a side view of the same steering apparatus 2; and FIG. 13 is a vertical sectional view of the same steering apparatus 2.

In the fourth embodiment, the first fixed portion 17b of the electrifying lead 17 is fixed to the inner column 11 in a way that joins the first fixed portion 17b and the guide member 31 together by the stepped low head bolt 35, while the second fixed portion 17c of the electrifying lead 17 is fixed to the outer column 10 by the screw 18. The electrifying lead 17 according to the fourth embodiment is different from the lead in the first embodiment in terms of the lead wire 17a being formed in a spiral shape exclusive of the both ends thereof, and others have the same configurations as in the first embodiment.

The second fixed portion 17c of the electrifying lead 17 has the annular portion receiving the insertion of the screw 18, and is fixed by inserting the screw 18 into the annular portion thereof and fastening the screw 18 in a screw hole formed in a portion, on a more forward side of the vehicle than the guide groove 25, of the outer column 10. The lead wire 17a of the electrifying lead 17 is disposed more outward in the radial direction than the outer peripheral surface of the outer column 10 due to a rise of the first fixed portion 17b. The electrifying lead 17 does not slacken even when the inner column 11 is in an adjustment limit position on the front side of the vehicle, and has a length sufficient for when the inner column 11 is in the adjustment limit position on the rear side of the vehicle. When making the telescopic adjustment, the electrifying lead 17 follows a motion of the inner column 11 while preventing the slack by an expansion and a contraction of the spiral portion of the lead wire 17a.

With the configuration described above, the fourth embodiment ensures the electrifying path led to the tilt bracket 12 and the vehicle body via the outer column 10 from the inner column 11.

According to the first through third embodiments discussed above, the new electrifying path leading to the vehicle body from the steering wheel can be ensured.

The specific embodiments described above are used for facilitating comprehension of the present invention, and the present invention can be modified and improved in a variety of modes without being limited to those embodiments.

For example, the embodiments described above are configured to apply the present invention to the rack assist type electric power steering apparatus and can be, as a matter of course, applied to a column assist type electric power steering apparatus.

The specific configurations of the steering column, the telescopic adjustment mechanism and the upper stopper can be properly modified within the range that does not deviate from the gist of the present invention. For instance, the steering apparatus can be configured to disable the tilt adjustment form being made.

It may be sufficient that the electrifying lead 17 is configured to enable the electrifying path to be ensured, which extends from the inner column 11 up to the tilt bracket 12, and the shape of the electrifying lead 17, and the method for and the position of fixing the electrifying lead 17 to other members are not limited to those described above.

The third embodiment has demonstrated the configuration that the tab terminal 37c is bent upward at 90°, and the bending angle is not, however, limited to 90°. The positions of the rotation stoppers are not limited to those in the embodiments described above but may be provided, e.g., on the bilateral sides.

The third embodiment has demonstrated also the configuration that the portion, on the side of the inner column 11, of the electrifying lead 17 is formed as the plug type connection terminal 17f, and such a configuration can be, however, adopted that a portion, on the side of the tilt bracket 12, of the electrifying lead 17 is formed as the plug type connection terminal, and this terminal is fitted in the electrifying terminal attached to the tilt bracket 12.

The fourth embodiment has demonstrated the configuration not using the plug type connection terminal, and such a configuration may also be, however, taken that a portion, on the side of the inner column 11, of the electrifying lead 17 is formed as the plug type connection terminal, and this terminal is fitted in the electrifying terminal attached to the inner column 11. The fourth embodiment may also take a configuration that the portion, on the side of the outer column 10, of the electrifying lead 17 is formed as the plug type connection terminal, and this terminal is fitted in the electrifying terminal attached to the outer column 10. The fourth embodiment may further take a configuration that the two portions, on both sides of the outer column 10 and the inner column 11, of the electrifying lead 17 are formed as the plug type connection terminals, and these terminals are fitted in the electrifying terminals attached respectively to the outer column 10 and the inner column 11.

According to the third embodiment, the electrifying terminal 37 is joined to the guide member 31 together by the stepped low head bolt 35, and such a configuration may also be taken that the electrifying terminal 37 is secured to the stepped low head bolt 35 or the stopper base 32 by gripping like a clip. Another available configuration is that the electrifying lead 17 is brought into direct contact with the inner column 11.

DESCRIPTION OF THE REFERENCE NUMERALS AND SYMBOLS 1 steering mechanism
2 steering apparatus
3 steering shaft
10 outer column
11 inner column
11a through-hole
12 tilt bracket
13 inner peripheral surface
17 electrifying lead
18 screw
21 collar
22 pivot boss
22a boss hole
23, 24 guide wall
25 guide groove
25a, 25b inner surface
26 slit
27 ball bearing
28 through-hole
29 ball bearing
30 upper stopper
31 guide member 32 stopper base
32a through-hole
35 stepped low head bolt
35a screw shaft
35b upper stepped portion
36 nut plate
36a boss
36b upper surface
36c screw hole
37 electrifying terminal
38a, 38b run-off
39 screw
50 lower stopper
51 resin pin
52 buffer retaining portion
53 buffer block
54 engaging arm
61 lower steering shaft
61a male spline
61b serration
62 upper steering shaft
62a female spline
62b serration
71 upper plate
71a bolt hole
71b, 71c engaging hole
72 left side plate
72a tilt adjustment elongate hole
73 right side plate
73a tilt adjustment elongate hole
80 clamp mechanism
81 clamp bolt
81a male screw
82 operation lever
83 movable cam
84 fixed cam
85 friction plate
85a elongate hole
86 intermediate friction plate
86a, 86b end plate
86c connection plate
87 pressing plate
88 thrust bearing
89 nut
91, 92 hook portion
93 coil spring
95 coil spring
101 steering wheel
102 intermediate shaft
103 steering gear
104 electric assist mechanism
105 tie rod

What is claimed is:

1. A steering apparatus comprising:
    a steering shaft having a conductive property and transferring a steering force;
    an outer column having a conductive property and supporting the steering shaft rotatably;
    an inner column having a conductive property, being fitted in the outer column to enable a relative movement in an axial direction and supporting the steering shaft rotatably together with the outer column;
    a bracket having a conductive property, retaining the outer column and being fixed to a vehicle body; and
    an electrifying lead having a conductive property and configuring a part of an electrifying path leading to the vehicle body from the inner column,
    wherein the outer column is formed therethrough in a radial direction with a guide groove extending in the axial direction, and
    a connection of the electrifying lead is made through the guide groove.

2. The steering apparatus according to claim 1, further comprising:
    a guide member being received within the guide groove and attached to the inner column; and
    a fixing means having a conductive property and fixing the guide member to the inner column,
    wherein one end of the electrifying lead is fixed to the inner column by the fixing means.

3. The steering apparatus according to claim 2, wherein the other end of the electrifying lead is connected to the bracket.

4. The steering apparatus according to claim 2, wherein the other end of the electrifying lead is connected to the outer column.

5. The steering apparatus according to claim 2, wherein the fixing means has a bolt, and
    the electrifying lead includes an annular portion receiving insertion of a screw shaft of the bolt.

6. The steering apparatus according to claim 2, wherein the electrifying lead is fixed to the inner column via an electrifying terminal fixed to the inner column by the fixing means.

7. The steering apparatus according to claim 1, wherein a low friction material is coated over an inner peripheral surface of the outer column or an outer peripheral surface of the inner column.

8. The steering apparatus according to claim 1, wherein the steering shaft is configured by fitting an upper steering shaft being disposed on a rear side of a vehicle to a lower steering shaft being disposed on a front side of the vehicle, and
    resin coating is applied to the upper steering shaft or the lower steering shaft at the fitted portion.

9. A steering apparatus comprising:
    a steering shaft having a conductive property and transferring a steering force;
    an outer column having a conductive property and supporting the steering shaft rotatably;
    an inner column having a conductive property, being fitted in the outer column to enable a relative movement in an axial direction and supporting the steering shaft rotatably together with the outer column;
    a bracket having a conductive property, retaining the outer column and being fixed to a vehicle body; and
    an electrifying lead having a conductive property and configuring a part of an electrifying path leading to the vehicle body from the inner column,
    wherein the electrifying lead includes a rising portion rising outward in the radial direction of the inner column.

10. The steering apparatus according to claim 9, wherein the bracket includes an upper plate being disposed upward of the outer column,
    the rising portion is disposed upward of the outer column, and
    the upper plate has a recessed portion being recessed in the axial direction to avoid interfering with the electrifying lead.

11. The steering apparatus according to claim 9, wherein a low friction material is coated over an inner peripheral surface of the outer column or an outer peripheral surface of the inner column.

12. The steering apparatus according to claim 9, wherein the steering shaft is configured by fitting an upper steering shaft being disposed on a rear side of a vehicle to a lower steering shaft being disposed on a front side of the vehicle, and resin coating is applied to the upper steering shaft or the lower steering shaft at the fitted portion.

13. A steering apparatus comprising:

a steering shaft having a conductive property and transferring a steering force;

an outer column having a conductive property and supporting the steering shaft rotatably;

an inner column having a conductive property, being fitted in the outer column to enable a relative movement in an axial direction and supporting the steering shaft rotatably together with the outer column;

a bracket having a conductive property, retaining the outer column and being fixed to a vehicle body; and an electrifying lead having a conductive property and configuring a part of an electrifying path leading to the vehicle body from the inner column, wherein the relative movement in the axial direction between the inner column and the outer column is enabled when making a telescopic adjustment and upon a secondary collision, and the electrifying lead has a length sufficient for configuring a part of the electrifying path at least in an adjustment range of the telescopic adjustment and in a movement range upon the secondary collision.

14. The steering apparatus according to claim 13, wherein a low friction material is coated over an inner peripheral surface of the outer column or an outer peripheral surface of the inner column.

15. The steering apparatus according to claim 13, wherein the steering shaft is configured by fitting an upper steering shaft being disposed on a rear side of a vehicle to a lower steering shaft being disposed on a front side of the vehicle, and resin coating is applied to the upper steering shaft or the lower steering shaft at the fitted portion.

\* \* \* \* \*